Oct. 23, 1928.

B. M. W. HANSON 1,689,135

METAL WORKING MACHINE

Filed March 11, 1922

Inventor
Bengt. M. W. Hanson
By T. Clay Lindsey.
His Attorney

Oct. 23, 1928.

B. M. W. HANSON 1,689,135

METAL WORKING MACHINE

Filed March 11, 1922   7 Sheets-Sheet 4

Inventor
Bengt M.W. Hanson
by
His Attorney

Oct. 23, 1928.  
B. M. W. HANSON  
METAL WORKING MACHINE  
Filed March 11, 1922  
1,689,135  
7 Sheets-Sheet 6

Inventor  
Bengt M. W. Hanson  
by W. Clay Lindsey  
His Attorney

Oct. 23, 1928.

B. M. W. HANSON 1,689,135

METAL WORKING MACHINE

Filed March 11, 1922

Patented Oct. 23, 1928.

1,689,135

UNITED STATES PATENT OFFICE.

BENGT M. W. HANSON, OF HARTFORD, CONNECTICUT; EINAR A. HANSON EXECUTOR OF SAID BENGT M. W. HANSON, DECEASED.

METAL-WORKING MACHINE.

Application filed March 11, 1922. Serial No. 543,109.

This invention relates generally to metal working machines, and has particular reference to a machine for shaping or contouring curved members or surfaces.

In the present disclosure of my invention, which is by way of illustration only and is not to be taken as restrictive of my conception, I show and describe the various features of novelty incorporated in a machine for grinding contour milling cutters or the like, and while the invention has peculiar adaptability for this use, I wish it clearly understood that the invention is susceptible of various modifications and changes in construction and arrangement, and that the terms here used are merely terms of description and not terms of limitation.

In the particular form of the embodiment of the invention here shown, the machine is provided with a cutter holding or supporting means and tool holding or supporting means, the tool being in the form of a grinding wheel with a convex periphery or cutting edge, and one of these means, in the present instance the tool holding means, being mounted for movement longitudinally of the teeth of the cutter and also laterally or radially thereof so that the grinding wheel in its grinding operation may be caused to follow the contour of the cutter teeth throughout the length thereof. For the purpose of properly guiding the tool holding means so that the grinding wheel will give the desired contour to the teeth of the cutter, a pattern or former plate, having an edge corresponding to the desired outline of the cutter teeth, and a cooperating abutment or stud, the latter being preferably carried by the tool holding means, are provided.

Figure 11:
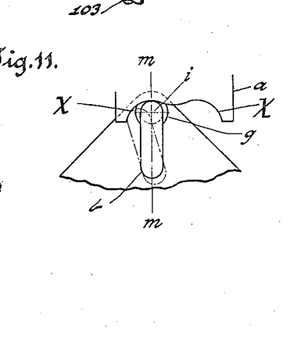
Figs. 11 and 12 are diagrammatic views showing the relation of certain of the parts.
Figure 12:
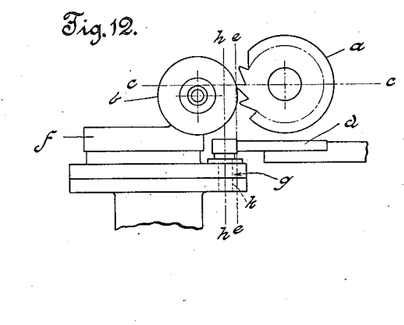

As well understood in the art of grinding contour milling cutters, in order to obtain the proper relief or tooth clearance, the axes of the cutter and the grinding wheel should be offset relative to one another, as, for instance, is illustrated in the diagrammatic view of Fig. 12. It will be seen from this figure, wherein a right handed cutter is illustrated, the axis of the cutter is offset vertically above the axis of the tool so that a plane which includes the line on which the grinding wheel engages the tooth is parallel to the axis of the grinding wheel but is spaced vertically thereabove. This plane, for convenience, may be referred to as the grinding plane. The peripheral edge of the grinding wheel in this plane should be semi-circular, as illustrated in Fig. 11. The amount of offset will depend, of course, on the kind of cutter, the diameter thereof, and other factors all of which are understood in the art.

It will further be understood that where the axis of the grinding wheel is maintained at all times in parallelism with the axis of the cutter, the clearance on those portions of the teeth which are substantially in parallelism with the axis of the cutter will be as desired, but the clearance on those portions of the teeth which are at an angle to the axis of the cutter, such, for instance, as the portion X, indicated in Fig. 11, will be less than that desired. In accordance with the present invention, in order to obtain a more correct clearance or relief throughout the entire length of the cutter teeth, provision is made for angularly adjusting the cutter and grinding wheel one relative to the other. In the present illustrative disclosure, the grinding wheel is so angularly adjustable, and the angular movement of this grinding wheel is about a line or center perpendicular to the grinding plane and including the center of transverse curvature of the grinding wheel periphery in that plane. This line is coincident with the center of curvature of the active face of the follower stud or abutment. This face of the abutment is also of the same curvature as the transverse curvature of the grinding wheel in the grinding plane, and the former plate is in vertical alinement with the tooth of the cutter being ground. This arrangement will be more clearly understood from Figs. 11 and 12 which show diagrammatically top and end views, respectively.

In these figures, $a$ denotes the work or cutter which, during the grinding operation, is held stationary, and $b$ is the grinding wheel, the periphery of which is semi-circular in the grinding plane $c$—$c$. $d$ is the former plate also fixed against movement and the operating edge of which corresponds to and is in vertical alinement with the edge of the tooth operated upon, as indicated by the line $e$—$e$. The grinding wheel is carried by a holder $f$ which, as stated, has a free floating movement longitudinally and laterally of the cutter, as hereinafter described, and this holder is pivoted as at $g$, the axis of the pivot being in vertical alinement, as indicated by the line $h$—$h$, with the center of transverse curvature $i$ of the periphery of the grinding wheel in the grinding plane. $k$ is the follower stud, the active surface of which is curved about the line $h$—$h$ as a center. It will now be seen that any line $e$—$e$ passing through corresponding points of the cutter and former is parallel to the line $h$—$h$.

With this arrangement, the grinding wheel may be angularly adjusted to effect proper clearance on all portions of the teeth of the cutter, while at the same time it will follow the contour of the former plate and thus give to the tooth of the cutter the desired shape or contour.

In accordance with the present invention, there is provided on the machine, preferably at a distance from the work holding means, so as not to interfere with the grinding operation, a wheel truing or resurfacing mechanism of such construction and arrangement that it may be adjusted and operated to give the wheel in the grinding plane a transverse circular cross section which shall be in vertical alinement with the active face of the particular follower stud employed and struck about a center in vertical alinement with the center of curvature of that face. This truing device is such that the very act of truing the grinding wheel therewith will bring the edge of the grinding wheel in the grinding plane into proper relation with the follower stud and the center about which the grinding wheel is angularly adjustable. Thus, the grinding of a tooth may be interrupted to resurface the wheel, the wheel be resurfaced by means of the truing device, and then the wheel brought back into engagement with the work with the assurance that the grinding edge of the wheel bears correct relation to the other parts of the machine during the grinding operation.

The machine of the present invention is provided with other features of novelty and advantage which will be pointed out more at length in the following detailed description.

In the accompanying drawings, wherein I have illustrated the preferred embodiment of my invention, it being understood, however, as stated, that this showing is by way of illustration only.

Fig. 7 is an elevational view of the truing device with the work holder cooperatively positioned relative thereto, this view being taken on substantially line 7—7 of Fig. 2;

Fig. 7$^a$ is a detail view showing the means for oscillating the grinding wheel;

Figure 1:
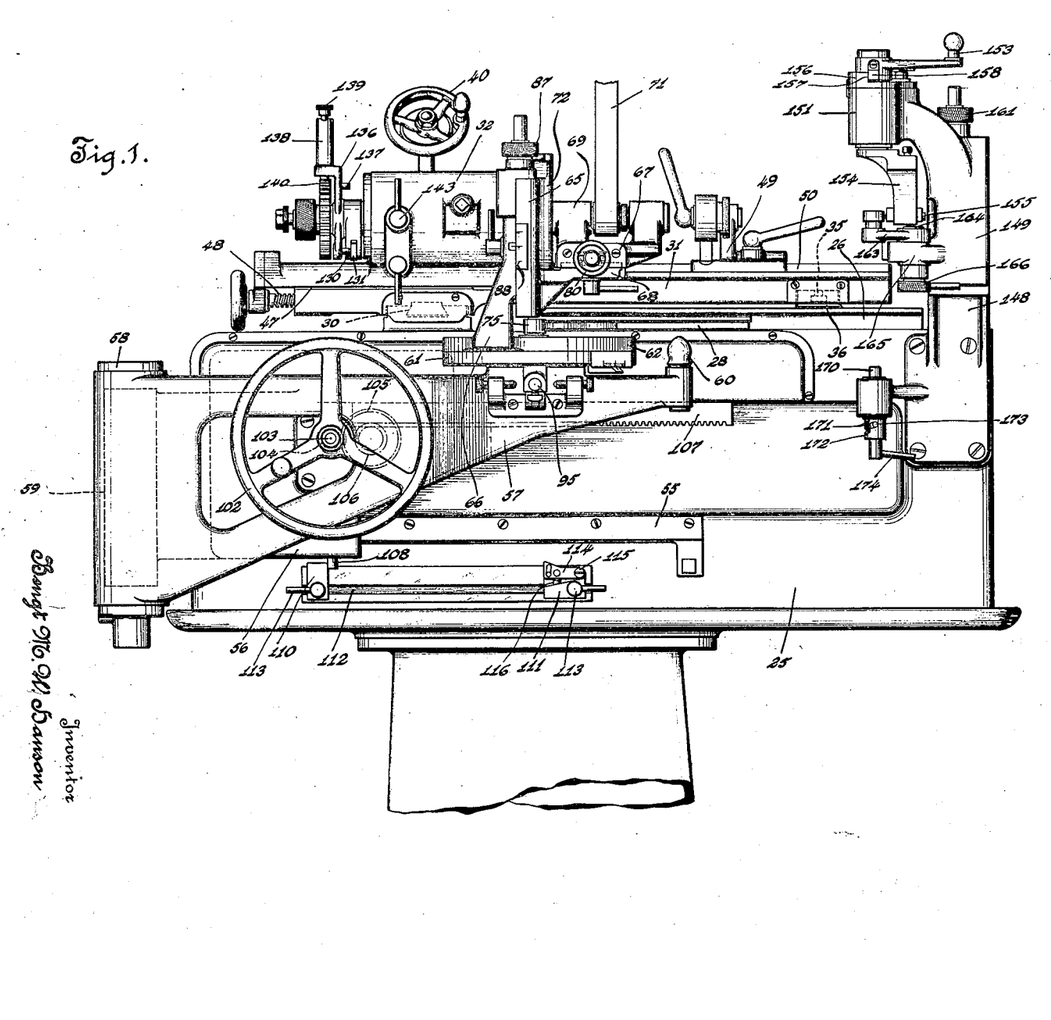
Fig. 1 is a front elevation of the machine.
Figures 7, 7A:
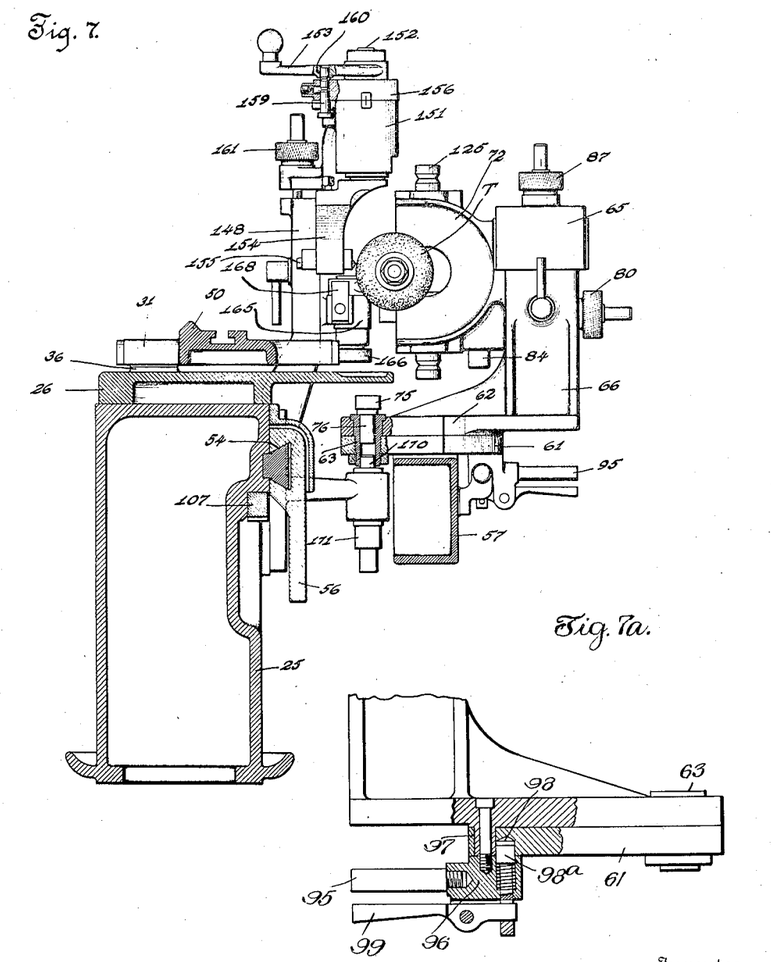

Referring to the drawings in detail, the frame of the machine is illustrated as provided with a hollow head 25 to the top of which is secured a cover plate 26 overhanging the front of the head and provided on its under side with an undercut groove in which is mounted for longitudinal adjustment a slide 27 carrying the former plate 28. The forward or active edge of this plate will, of course, have a contour relatively conforming to that to be given to the teeth of the cutter to be ground. The slide 27 is locked in any position of adjustment by a screw 29 (see Fig. 3). Mounted for transverse movement, in the present instance upon a way 30 extending transversely of the top of the head 25, is a work carrier comprising a main carriage 31 and a head stock or slide 32 having a work spindle 33. In the present illustrative disclosure, the carriage or main slide 31 overlies the plate 26 and, as shown in Figs. 1 and 7, has on its under surface a T-bar 35 engaging in the undercut groove of a transversely extending rib or way 36 on the cover plate. The carriage 31, together with the parts mounted thereon, may be moved in any suitable manner to bring the work up to and feed it into the tool, in the present instance this being accomplished (see Fig. 3) by turning a hand wheel 40 secured to a rearwardly and downwardly extending shaft 41 connected by gears 42 to a lead screw 43 cooperating with a nut 44 secured to the head 25. The head stock 32 is longitudinally adjustable (that is, in parallelism with the axis of the work spindle and at right angles to the direction of movement of the main carriage 31) on a way 47, this adjustment being brought about by the hand screw 48. If desired, the machine may be provided with a tail stock 49 adjustably mounted on a longitudinally extending way 50. In the drawings, I have shown, by way of example, the work as comprising a milling cutter W.

Provided on the front face of the head are longitudinally extending ways 54, 55, on which is mounted for sliding movement a slide 56 of the tool carrier. This tool carrier also includes a swinging arm 57 hingedly connected at one end, as by means of a pivot pin 58, to a hub 59 forming a part of the slide 56. The free end of the arm 57 carries a handle 60 by means of which the arm 57 may be swung towards the work to maintain the follower stud in engagement with the former plate and the grinding wheel in contact with the work. The arm 57, adjacent its free end, has a bracket or tool support 61 on which is mounted for angular movement in a horizontal plane what may be conveniently termed a work holder.

Figure 3:
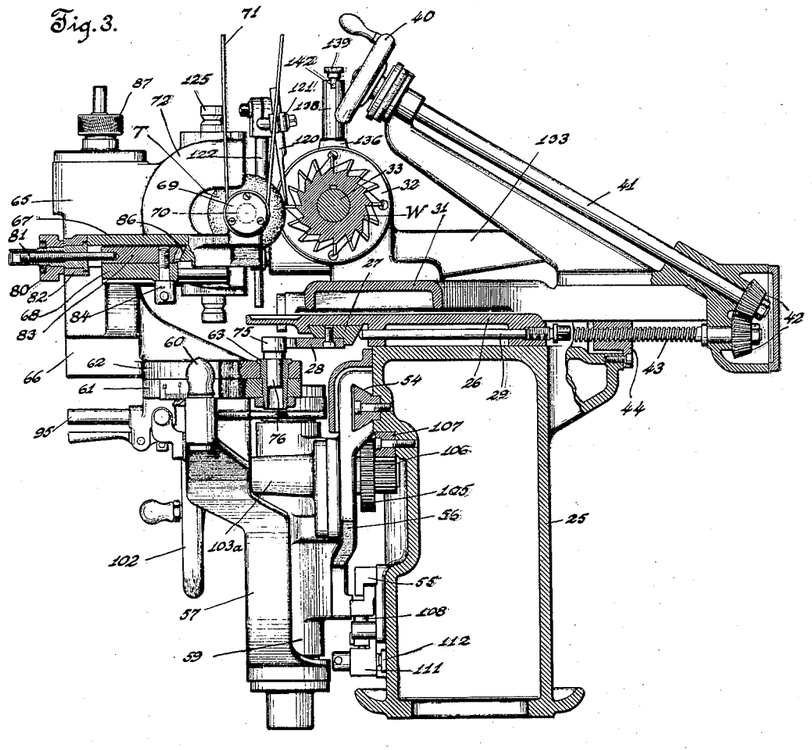
Fig. 3 is a transverse view taken vertically on line 3—3 of Fig. 1.

This work holder, as most clearly shown in Figs. 1 and 3, includes a turret 62 pivoted by means of a hollow sleeve 63 to the bracket 61; a slide 65 mounted for vertical adjustment on a standard 66 of the turret, and a transverse slide 67 supported for transverse movement on a shelf 68 forming a part of the slide 65. The transverse slide 67 is provided with suitable bearings 69 in which is journaled the tool spindle 70, driven in any suitable manner as by means of a belt 71. The tool, which is here shown as being in the form of a grinding wheel, is designated by the letter T. 72 is a guard for the grinding wheel.

As previously stated, the tool holder is provided with a follower stud adapted to cooperate with the active edge of the former plate so as to properly guide the grinding wheel during the grinding operation. Such a stud is indicated by the numeral 75 and is provided with a shank or stem 76 adapted to closely fit in the axial opening in the sleeve 63 which forms the pivot for the work holder. The edge of this stud is circular in cross section and its radius will correspond to the radius of the cutting edge of the grinding wheel, i. e., the transverse curvature of the periphery of the grinding wheel in the grinding plane. It will be understood that a number of studs having heads of different diameters will be provided so that there will be one stud for each thickness of grinding wheel to be used. It will be noted that the center of curvature of the follower stud is coincident with the axis about which the tool holder is angularly adjusted. The tool or grinding wheel is so located on the work holder that a plane passing at right angles to the axis of the grinding wheel spindle and centrally through the grinding edge of the grinding wheel will include the axis about which the holder is angularly adjusted (and therefore the center of curvature of the follower stud), and the grinding wheel is adjustable on the holder both vertically and horizontally in this plane. This plane is indicated by the line M—M of Fig. 11. The horizontal adjustment of the grinding wheel, that is the adjustment of the grinding wheel on a line at right angles to the axes of the follower stud and the pivot sleeve 63, is brought about by rotating a nut 80 (see Fig. 3) which is in threaded engagement with a screw 81. In the present instance, the nut is journalled against endwise movement in a bearing plate 82 fixed to the transverse slide 67 and the screw 81 is secured to a way or gib 83 carried by the shelf 68 of the vertical slide. The gib 83 is received by an undercut groove 86 on the under side of the transverse slide 67 in such manner that when the binding screw 84 is tightened up the transverse slide is securely clamped against movement. The transverse slide which carries the grinding wheel is moved only during the operation of retruing the grinding wheel. The grinding wheel is vertically adjustable so as to bring the axis of the grinding wheel into proper offset relation to the axis of the cutter being operated upon and thus effect the desired clearance, as heretofore described, by turning a nut 87 which is operatively connected to the slide 65 in a manner similar to the connection between the nut 80 and the transverse slide. The extent of offset may be determined by means of the scale 88 (see Fig. 1). For illustrative purposes, the tool holder is shown as being provided with a handle 95 by means of which the tool holder, together with the grinding wheel carried thereby, may be angularly adjusted or swung about the follower stud as a pivot. In the present instance, this handle is secured to a lug or gib 96 depending from the turret and working in an arcuate slot 97 in the bracket 61. For the purpose of holding the grinding wheel with its axis substantially parallel to the axis of the cutter, a recess 98 is provided in the under face of the bracket 61 and the handle carries a spring pressed plunger 98ᵃ for engagement in this recess. When it is desired to swing the turret about its pivot 63, the plunger is withdrawn from the recess by lifting the lever 99. The extent to which the turret and the wheel carried thereby may be swung may be limited by adjustable stops 100 which are in the form of screws carried by lug 101 on the bracket. The handle 95 is adapted to engage these stops, as will be clearly seen from the drawings. The angular position of the turret may be accurately determined by means of the scale 109 on the edge of the bracket 61 and the pointer 109ᵃ carried by the turret.

The main slide 56 of the tool carrier is moved longitudinally on the ways 54, 55, so as to move the grinding wheel lengthwise of the cutter, by turning a hand wheel 102 mounted on a shaft 103 journalled in a bearing 103ᵃ on the slide 56. On the rear end of the shaft 103 is a pinion 104 meshing with a gear 105 also journalled in the slide 56. Fixed to this gear is a pinion 106 meshing with a longitudinally extending rack 107 fixed to the forward face of the head 25. For the purpose of limiting the extent of longitudinal movement of the tool carrier, and thus prevent the follower stud from overrunning the ends of the former plate 28, the main slide 56 is provided with a depending projection 108 adapted to work between stops 110, 111, mounted for adjustment in a T-slot 112 provided on the front face of the head 25. The stops are clamped in adjusted position by binding screws 113. The right hand stop (referring to Fig. 1) includes a stop finger 114 pivoted as at 115 and normally urged into the path of movement of the projection 108 by a spring pressed plunger 116. This arrangement is provided to permit the projection 108 to clear the stop 111 when the tool carrier is moved towards the right to bring the tool holder in proper relation to the wheel truing device, as hereinafter described.

For the purpose of indexing the cutter operated upon so as to bring the succesive teeth thereof into proper grinding relation to the grinding wheel, I provide an indexing finger 120 against the end of which these teeth are adapted to be brought into engagement. Where the cutter operated upon has straight teeth (i. e. the teeth are parallel to the axis of the cutter, as shown in Fig. 3) the finger 120 may be secured in suitable manner to the head stock 32; for instance, it may be adjustably carried by a rod 121 longitudinally adjustable in a vertically adjustable stem 122 secured to the head stock 32.

Figure 4:
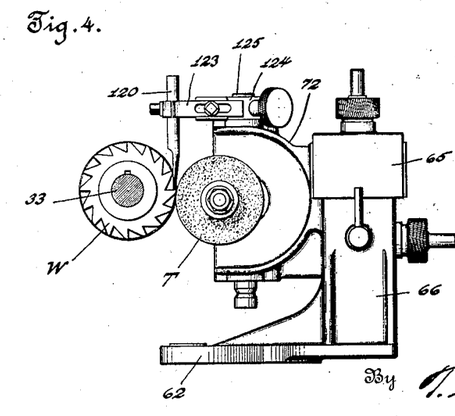
Fig. 4 is a detail view showing the finger for indexing the teeth of the cutter operated upon where the teeth of this cutter are spiral milled.
Figure 5:
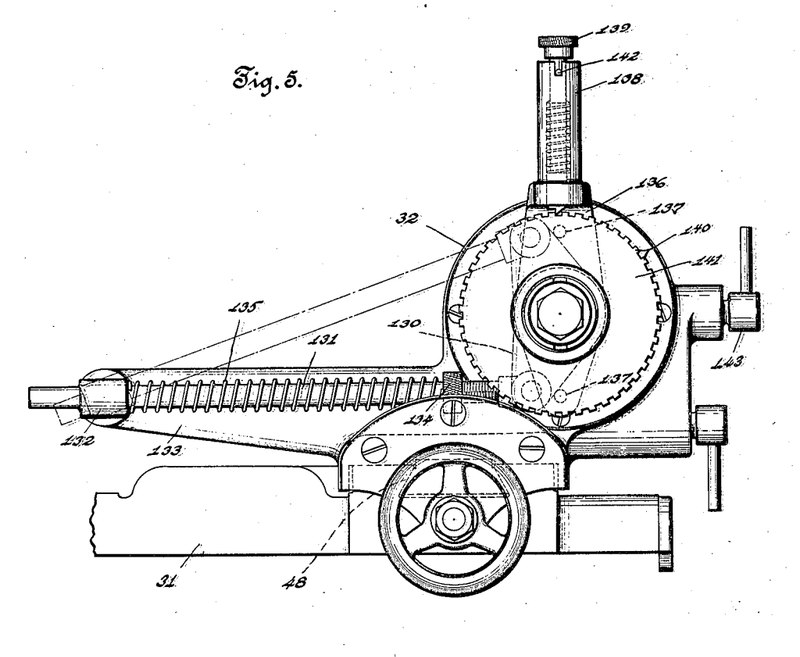
Fig. 5 is a detail view of the left hand end (referring to Fig. 1) of the head stock for the cutter or work, and illustrates the mechanism normally urging the spiral teeth of the cutter into engagement with the indexing finger.
Figure 6:
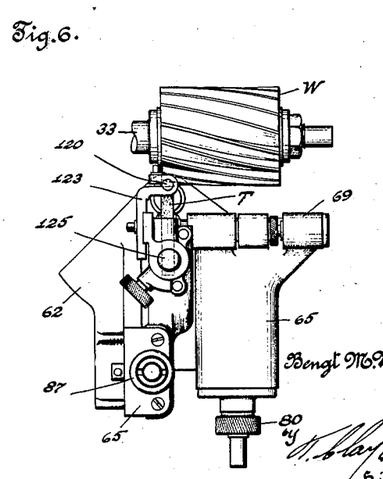
Fig. 6 is a top view illustrating the manner in which the indexing finger is secured to the tool holder and cooperates with the spiral teeth of the cutter.

During the grinding operation, the grinding plane of the wheel is fixed and, therefore, where the teeth of the cutter are spiral (as shown in Fig. 6) it is necessary as the tool is moved lengthwise of a cutter tooth, to turn the cutter about its axis to bring successive portions of the tooth operated upon into the grinding plane. To this end, the index finger 120 is secured to the tool holder in such position that its lower end is in the grinding plane and in the plane of the grinding wheel, and means are provided for normally rotating the cutter to maintain the tooth operated upon against this finger. In the present instance, as shown in Figs. 4 and 6, the index finger may be carried by an arm 123 adjustably connected to a sleeve 124 fixed to a stud 125 arising from the wheel guard 71. The means for normally rotating the cutter is most clearly disclosed in Figs. 1, 2 and 5. As there shown, loose on the outer end of the head stock spindle 33 is an arm 130 to which is secured one end of a rod 131. The other end of this rod has sliding movement in a sleeve 132 pivoted to a part 133 extended rearwardly from the head stock slide 32. About the rod 131, and positioned between an abutment or nut 134 thereon and the sleeve 132, is a spring 135 normally urging the rod towards the arm 130. Loose on the head stock spindle is a lever 136 having a pair of diametrically spaced apart abutments or pins 137. This lever carries a barrel or sleeve 138 in which is mounted a spring pressed plunger or pawl 139, the lower end of which engages the teeth 140 on the periphery of a disk 141 fixed to the head stock spindle. With this arrangement, it will be seen that when a left hand spiral cutter is secured (as shown in Figs. 4 and 6) to the head stock spindle, the rod 131 will be in the full line position shown in Fig. 5. Owing to the engagement of the arm 130 against the lower pin 137, the lever 136, together with the disk 141 and the head stock spindle connected to this disk, will rotate counter clockwise to maintain the tooth of the cutter against the indexing finger as the grinding wheel is moved lengthwise of the cutter tooth. When a right hand spiral cutter is to be operated on, the rod 131 will be thrown into the dotted line position of Fig. 5, in which position the arm 130 engages the upper stud 137, and the plunger 139 will be turned 180° within the sleeve 138 so that the lever 136, the disk 141 and the head stock spindle will rotate in unison in a clockwise direction. It will be seen that when the spring has moved the lever 136, say into the dotted line position in Fig. 5, the spring may again be placed under its initial tension by grasping the lever 138 and moving it to the full line position. When the sleeve 138 is moved from the dotted to the full line position, the pawl or plunger 139 will freely ride over the teeth of the disk 141. If desired, the spindle may be thrown out of the control of the means just described by pulling the plunger 139 outwardly of the sleeve until the pin 142 carried by this plunger rests upon the outer edge of the sleeve. Furthermore, if desired, as for instance when a straight toothed cutter is operated upon, the head stock spindle may be clamped in each indexed position by a binding screw 143.

Figure 2:
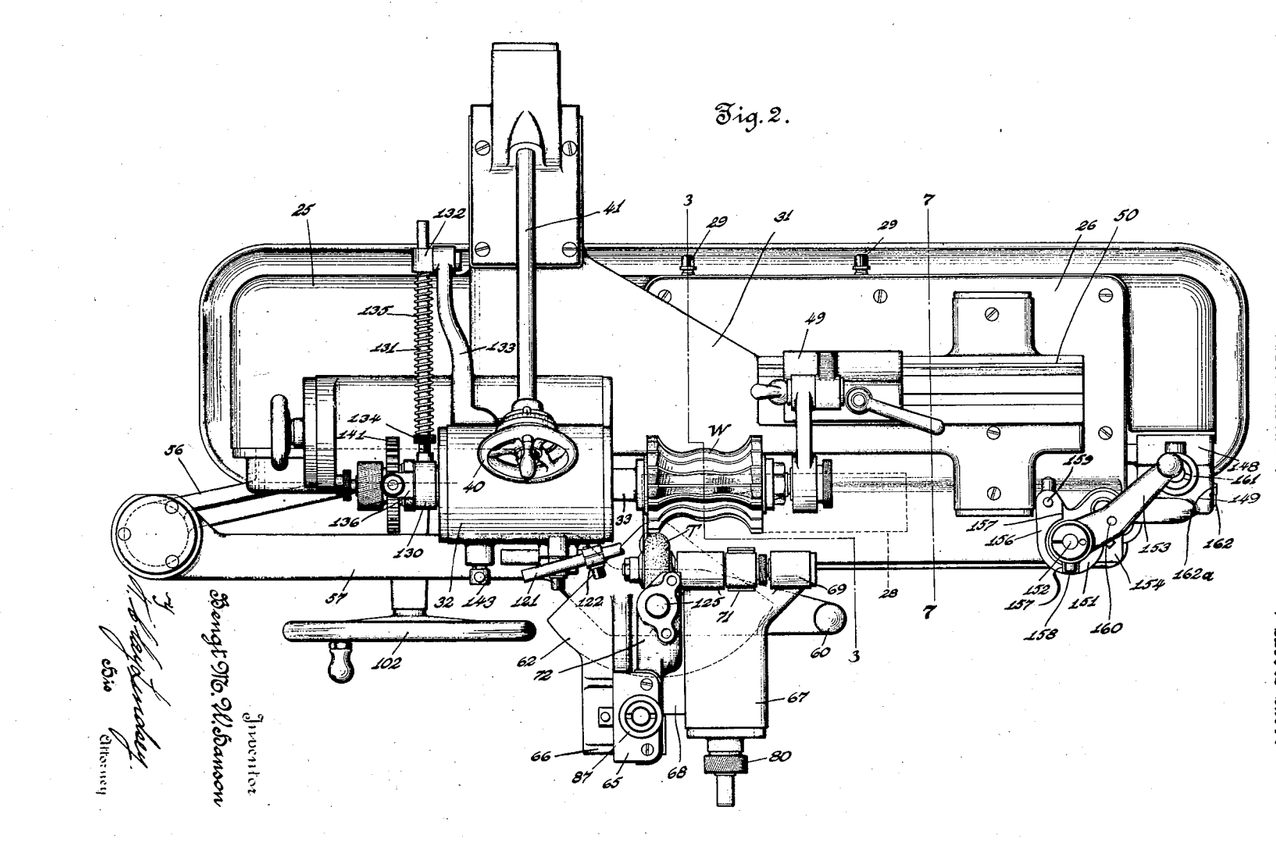
Fig. 2 is a top plan view.

Reference will now be had to the device for retruing or shaping the grinding wheel, this device being most clearly shown in Figs. 1, 2 and 7. Arising from the forward right hand corner of the head 25 is a standard or post 148 on which is mounted for vertical adjustment a slide 149 having a vertical bearing 151 in which is journalled a shaft 152 provided at its upper end with a handle 153 for oscillating the same, and at its lower end with a curved arm 154. Mounted in this curved arm 154, for adjustment in a line at right angles to the axis of the shaft 152, is a resurfacing tool 155, here shown as being in the form of a diamond point. On the top of the bearing 151 is secured a plate 156 provided with abutments 157 against which a stop 158 fixed to the operating handle 153 is adapted to be brought to limit the arc of movement of the diamond point to 180°. For the purpose of setting the diamond point in the mid position of its arc of movement, the plate 156 carries a spring pressed plunger 159 adapted to engage in an opening 160 in the handle 153. Vertical adjustment of the slide 149 may be brought about, so as to bring the diamond point into the grinding plane, by any suitable means, as, for instance, by means of a nut 161; that is to say, the diamond point may thus be vertically adjusted so that the plane in which it operates is offset to the axis of the grinding wheel in the same relation as the axis of the cutter is offset to the axis of the grinding wheel. The correct vertical position of the diamond point may be determined by means of a scale 162 on the face of the slide 149 and a co-operating indicating mark 162ª on the standard 148. In order to properly set the diamond point, so that the arc through which it swings will have the same radius as that of the transverse curvature to be given to the edge of the grinding wheel in the ginding plane, (this radius being one-half of the width of the wheel) a gage is provided. This gage includes a swinging arm 163 fixed to a pintle 164 mounted in a vertical bearing 165. On the lower end of the pintle is a head 166 by means of which the gage may be moved into and out of operative position. The free end of the arm 165 has a vertically disposed opening or seat 166 in which is adapted to be mounted a stud, which stud may be the particular former stud selected for cooperation with the former plate, or a stud having a head of like diameter. This stud, as previously pointed out, will have a radius equal to one-half of the thickness of the particular wheel employed in the grinding operation. For the purpose of positioning the arm 165 with the axis of the stud carried thereby in alinement with the axis about which the diamond point is swung (i. e., the axis of the shaft 152), there is provided on the standard 148 a positioning stop 168 (see Fig. 7) against which the arm is adapted to engage, as shown.

For the purpose of positioning the tool holder, with the wheel carried thereby, in proper operative relation to the adjusted diamond point, there is provided, in vertical alinement with the axis about which the diamond point is swung, a positioning pin 170 which is adapted to be received by the pivot sleeve 63 about which the grinding wheel holder is angularly adjustable, as shown in Fig. 7. This pin is located in a fixed sleeve 171 provided with a cam grove 172 in which works a projection 173 carried by the positioning pin 170. It will be seen that when the positioning pin is rotated in one direction, as by means of a handle 174 fixed thereto, the projection 173 will ride up the cam surface and thereby raise the pin so that the upper end thereof will engage in the lower end of the opening in the sleeve 63, and when the pin is rotated in the opposite direction, it is lowered and thus disengaged from the sleeve.

In setting up the machine for operation, a former plate, having an active edge corresponding in contour to that to be given to the teeth of the cutter, is properly adjusted on the head 25 and then clamped by the screw 29. The head stock 32 is longitudinally adjusted on the main carriage 31 so that corresponding points of the former plate and the teeth of the cutter are in alinement. A grinding wheel of the desired width is secured on the spindle 70 and a follower stud 75, having a head the radius of which is one-half the width of the wheel, is positioned in the pivot sleeve 63 for cooperation with the former plate. The slide 65 of the tool holder is vertically adjusted by turning the nut 87 to bring the axis of the wheel in such offset relation to the axis of the cutter that the proper relief is effected. The slide 149 carrying the diamond point is also vertically adjusted in accordance with the vertical adjustment of the grinding wheel slide 65 so that the diamond point will lie in the grinding plane. The selected former stud 75 or a stud of like diameter is placed in the gage arm 163, this arm will be thrown into the gaging position shown in Fig. 1, and the diamond point is adjusted longitudinally in the curved arm 154 until the point engages the periphery of the former stud and it is secured in this position. It will now be seen that the diamond point will move in the grinding plane in an arc having a radius equal to that of the transverse curvature of the periphery of the grinding wheel in the grinding plane. The tool carriage will be moved to the right, referring to Fig. 1, and properly held relative to the diamond point by means of the positioning pin 170. Preferably, the tool holder or turret 66 will be locked in its mid position to the bracket or support 61 by means of the spring pressed plunger 98, as shown in Fig. 7ª. The diamond point will be held in its mid position by the engagement of the plunger 159 in the opening 160 of the operating handle 153, thus insuring that when the grinding wheel is moved up to the diamond point, the latter will engage the periphery of the grinding wheel at its most worn point. The wheel is now in position to be retrued or resurfaced and in this operation the handle 153 is moved to swing the diamond point in its arc and the grinding wheel is moved horizontally towards the diamond point by adjusting the transverse slide 67 on which the grinding wheel is mounted. It will be noted that, (since the diamond point is located in the grinding plane, the center about which the turret is moved is in vertical alinement with the center about which the diamond point is swung, and the grinding wheel is moved horizontally up to the tool in a plane which includes the axis about which the diamond point is swung and the axis about which the turret is angularly adjustable) the cutting edge of the grinding wheel in the grinding plane is at all times maintained constant relative to the axis about which the grinding wheel is angularly adjustable and in vertical alinement with the active face of the former stud. After the grinding wheel is thus redressed, the positioning pin 170 is lowered and the tool carrier is moved into the position where the former stud engages the active face of the former plate. During the grinding operation, the main slide 31 is moved transversely to bring and maintain the edge of the tooth operated upon in vertical alinement with the active edge of the former plate. It will be understood that the tool carrier is moved longitudinally by moving the handle 60 located on the swinging arm 57 and, owing to the engagement of the former stud against the former plate, the grinding wheel will be moved in a path corresponding to the contour to be given to the teeth of the cutter. When the grinding wheel is to operate upon a portion of the cutter teeth which is sharply inclined to the axis of the cutter, the turret is swung about its pivot 63 so as to bring the grinding wheel at a greater angle to the inclined portion of the tooth and thus effect a greater relief on this portion than could be obtained if the axis of the grinding wheel were maintained parallel to that of the cutter. It will be seen that, (since the periphery of the grinding edge is semi-circular in cross section in the grinding plane, the grinding wheel is angularly adjusted about an axis perpendicular to the grinding plane and passing through the center of curvature of the grinding edge, and further, since the grinding edge of the wheel is in vertical alinement with the active face of the former stud) the relation of the grinding edge of the wheel to the former stud and former plate does not change when the wheel is angularly adjusted, and this means that the grinding edge of the wheel will follow a predetermined path irrespective of the angular adjustment of the grinding wheel. In the event that the wheel becomes worn during the grinding operation, it may be resurfaced by means of the diamond point and then moved back to operative position relative to the work with the assurance that the grinding wheel is accurately positioned relative to the former stud.

Figure 8:
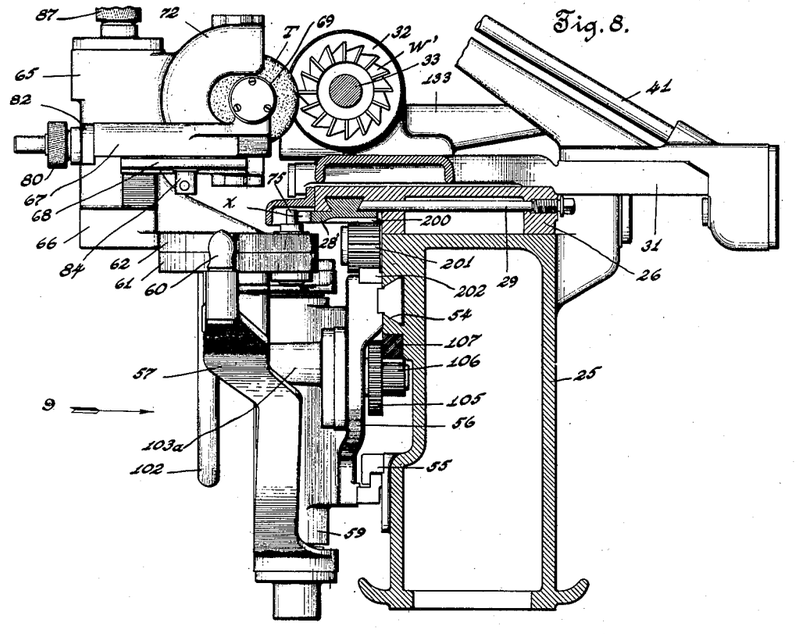
Fig. 8 is a view similar to Fig. 7 but illustrating means for moving the former plate.
Figure 9:
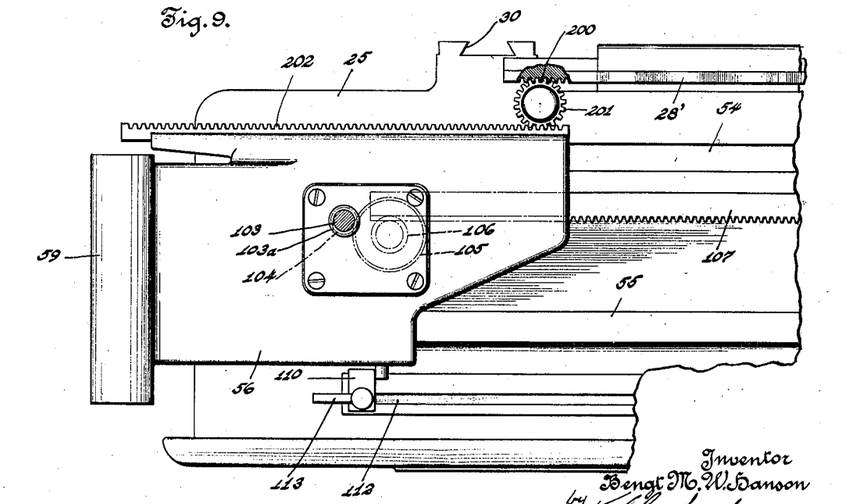
Fig. 9 is a view looking in the direction of the arrow 9 of Fig. 8, the swinging arm of the tool carrier and the parts supported thereon being removed.
Figure 10:
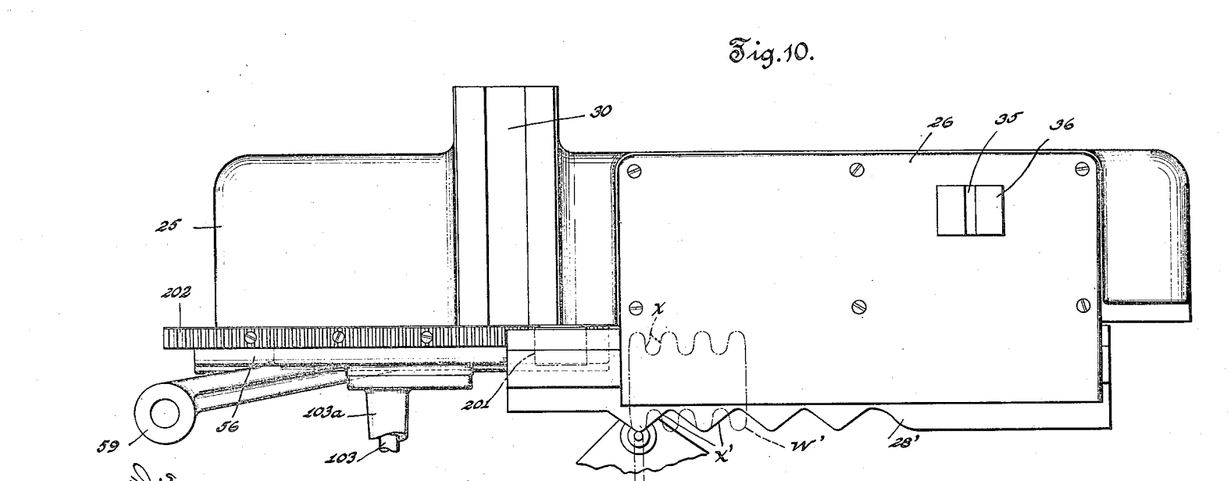
Fig. 10 is a top plan view of what is shown in Fig. 9.

Reference will now be made to Figs. 8, 9 and 10, wherein I have shown an arrangement by means of which I facilitate the guiding of the grinding wheel in its longitudinal and lateral movement during the grinding operation. In Fig. 10, I have shown a cutter W', the teeth of which have portions $x$ which are sharply inclined to the axis of the cutter. In the event that a former plate is employed having an active edge exactly similar to the contour of the cutter teeth, it will be seen that difficulty would be experienced in moving the former stud along the active edge of the former plate, that is to say, as the tool carrier is urged lengthwise of the machine, the stud will come up against portions of the former plate corresponding to the portions $x$ of the cutter and since there is little or no cam action exerted by these portions there is little tendency for the stud to move laterally in and out, as the case may be. To overcome this difficulty, I provide a former plate the active edge of which conforms relatively to but is greater in length than the contour to be given to the teeth of the cutter, and this former plate is moved during the grinding operation so as to successively bring corresponding portions of the plate and cutter in vertical alinement as the grinding wheel is moved longitudinally of the cutter. In Figs. 8, 9 and 10, the former plate is indicated by the numeral 28' and the active face of this contour is twice the length of the teeth to be ground. It will be seen that the inclined portion $x'$ of the former plate is twice as long as the corresponding portion $x$ of the cutter and its angle of inclination relative to the axis of the cutter is one-half that of the portion $x$ of the cutter tooth. The former plate 28' is mounted for longitudinal sliding movement and has on its under face a rack 200 with which meshes a gear 201 journalled on the head 25. On the top of the main slide 50 of the tool carrier is a rack 202 also meshing with the gear 201. It will now be seen that when the hand wheel 102 is rotated to move the grinding wheel longitudinally of the work, the former plate will be moved in the opposite direction and at a like rate of speed, and the result is that at any given time the grinding wheel and the former stud are in respective engagement with corresponding points of the cutter tooth and the former plate. It is, of course, obvious that the surfaces $x'$ of the former plate have a cam action which will permit the former stud to readily follow the contour of this former plate.

In accordance with the provisions of the patent statutes, I have described the principle of operation of my invention, together with the apparatus which I now consider to represent a practical embodiment thereof, but I desire to have it understood that the machine shown is only illustrative, it being susceptible of various modifications and changes. Also, as previously stated, the terms used are by way of description and are not to be taken as restrictive; for instance, in some instances, horizontal and vertical planes are referred to, but these terms are used merely for conveniently expressing the relation of the several parts.

I claim as my invention:—

1. In a machine of the character described, cutter holding means and a grinding wheel having a transverse convex cutting edge, said means and wheel being mounted for movement longitudinally and laterally one relative to the other during the grinding operation, means for guiding said holding means and grinding wheel one relative to the other in a predetermined path corresponding to the contour to be given to the teeth of the cutter, and means for supporting said grinding wheel for angular movement about the center of curvature of the cutting edge thereof.

2. In a machine of the character described, cutter holding means and a grinding wheel mounted for longitudinal and lateral movement one relative to the other during the grinding operation, means for guiding said holding means and grinding wheel one relative to the other and including a member having a predetermined relation to the cutter mounted in said holding means and a member movable with said grinding wheel and adapted to cooperate with said first member, and means for supporting said grinding wheel for angular movement while maintaining the predetermined relation between said cutter holding means and said first mentioned member.

3. In a machine of the character described, cutter holding means, a grinding wheel having a transverse convex cutting edge, means for supporting said grinding wheel for angular movement about the center of curvature of said convex cutting edge, and means for guiding said cutter holding means and wheel supporting means one relative to the other to cause the grinding edge of the wheel to move in a predetermined path irrespective of the angular position of said wheel.

4. In a machine of the character described, cutter holding means and wheel supporting means mounted for movement longitudinally and laterally one relative to the other during the cutting operation, means for guiding one of said means relative to the other in a predetermined path corresponding to the contour to be given to the teeth of the cutter and including a former plate having a predetermined relation to the cutter and a stud movable with said wheel supporting means and adapted to cooperate with said plate, and a grinding wheel having a convex cutting edge carried on said wheel supporting means for angular adjustment about an axis passing through the center of curvature of said cutting edge and the axis of said stud.

5. In a machine of the character described, cutter holding means, a grinding wheel having a transverse convex cutting edge, means for supporting said grinding wheel for movement in a horizontal plane longitudinally and laterally of the cutter and for angular movement about a vertical axis passing through the center of curvature of said cutting edge, and means for guiding said grinding wheel including a former plate having a predetermined relation to the cutter carried by said holding means and a stud cooperating with said plate and having an active face curved correspondingly to and in vertical alinement with the cutting edge of the grinding wheel.

6. In a machine of the character described, a frame, a former plate thereon, cutter holding means on said frame adapted to hold a cutter with the teeth to be operated upon in vertical alinement with the active edge of said former plate, wheel supporting means mounted for movement on a horizontal plane longitudinally and laterally of the cutter, a grinding wheel having a convex cutting edge carried on said supporting means for angular adjustment about the center of curvature of said cutting edge, and a stud on said supporting means cooperating with said former plate.

7. In a machine of the character described, a frame, a former plate mounted thereon, holding means adapted to support a cutter with its teeth in vertical alinement with the active edge of said former plate, wheel supporting means mounted for movement in a horizontal plane longitudinally and laterally of the cutter, a stud carried by said wheel supporting means and having a curved active face adapted to cooperate with said plate, and a grinding wheel having a transverse convex cutting edge conforming to said face of said stud, said wheel being mounted on said wheel supporting means for angular adjustment about a vertical axis including the center of curvature of said grinding edge and said active face of said stud.

8. In a machine of the character described, cutter holding means, wheel supporting means mounted for movement in a horizontal plane laterally and longitudinally of said holding means, means for guiding said supporting means in a predetermined path corresponding to the contour to be given to the teeth of the cutter, and a grinding wheel mounted on said supporting means for horizontal and vertical adjustment in the plane in which the wheel rotates.

9. In a machine of the character described, work holding means and a grinding wheel mounted for movement longitudinally and laterally one relative to the other during the grinding operation, means for guiding said holding means and grinding wheel one relative to the other in a predetermined path corresponding to the contour to be given to the work, means for supporting said grinding wheel for angular adjustment about an axis other than its center of rotation, and means for adjusting said wheel in the central plane thereof relative to said axis.

10. In a machine of the character described, cutter holding means and a grinding wheel having a transverse convex cutting edge, said means and wheel being mounted for movement longitudinally and laterally one relative to the other during the grinding operation, means for guiding said holding means and grinding wheel one relative to the other in a predetermined path corresponding to the contour to be given to the teeth of the cutter, and means for supporting said grinding wheel for angular movement about the center of curvature of the cutting edge thereof and for bodily adjustment in the central plane thereof relative to the axis about which the wheel is so angularly adjusted.

11. In a machine of the character described, cutter holding means and grinding wheel holding means mounted for movement longitudinally and laterally one relative to the other during the grinding operation, means for guiding said holding means one relative to the other in a predetermined path corresponding to the contour to be given to the teeth of the cutter, and a grinding wheel having a transverse convex cutting edge carried by said wheel holding means for angular movement about a line included in the central plane of said wheel and for bodily adjustment in said plane to and from said line.

12. In a machine of the character described, cutter holding means and wheel supporting means for movement longitudinally and laterally one relative to the other during the cutting operation, means for guiding one of said means relative to the other in a predetermined relation to the cutter and a stud movable with said wheel supporting means and adapted to cooperate with said plate, and a grinding wheel mounted for angular adjustment about the axis of said stud and for bodily adjustment in the central plane of the wheel to and from said axis.

13. In a machine of the character described, cutter holding means, wheel supporting means mounted for movement in a horizontal plane longitudinally and laterally of the cutter carried by said cutter holding means, and a grinding wheel having a transverse cutting edge adapted to engage the cutter, said grinding wheel being carried by said wheel supporting means for angular adjustment about a vertical axis passing through the center of curvature of said cutting edge and for horizontal adjustment in the plane in which the wheel rotates.

14. In a machine of the character described, a frame, a former plate thereon, cutter holding means on said frame adapted to hold a cutter with the teeth to be operated upon in vertical alinement with the active edge of said former plate, wheel supporting means mounted for movement in a horizontal plane longitudinally and laterally of the cutter, a stud on said supporting means cooperating with said former plate, and a grinding wheel having a convex cutting edge corresponding to the curvature of said stud, said wheel being mounted on said supporting means for angular adjustment about the axis of said stud and for bodily adjustment in the plane of the wheel relative to said axis.

15. In a machine of the character described, a frame, cutter holding means mounted thereon, wheel supporting means mounted for movement in a horizontal plane longitudinally and laterally of said holding means, means for guiding said supporting means including a former plate mounted on said frame and a stud mounted on said wheel supporting means, a grinding wheel mounted on said supporting means for adjustment in its central plane and on a horizontal line, and means for transversely adjusting said cutter holding means relative to said former plate.

16. In a machine of the character described, a frame, cutter holding means mounted thereon, wheel supporting means mounted for longitudinal and lateral movement relative to the cutter carried by said holding means, means for guiding said wheel supporting means in a predetermined path and including a former plate mounted on said frame and a stud mounted on said wheel supporting means, a grinding wheel mounted on said wheel supporting means, means for adjusting said grinding wheel in its central plane relative to the axis of said stud, and means for adjusting said cutter holding means transversely of said former plate.

17. In a machine of the character described, cutter holding means and a grinding wheel mounted for movement longitudinally and laterally one relative to the other during the grinding operation, means for guiding said holding means and grinding wheel one relative to the other in a predetermined path corresponding to the contour to be given to the work, means for supporting said grinding wheel for angular adjustment about an axis other than its center of rotation, means for adjusting said wheel in a central plane at right angles to said axis, and means for transversely adjusting said work holding means.

18. In a machine of the character described, work holding means and a grinding wheel mounted for movement longitudinally and laterally one relative to the other during the grinding operation, means for guiding said holding means and grinding wheel one relative to the other in a predetermined path corresponding to the contour to be given to the work, means for supporting said grinding wheel for angular adjustment about an axis other than its center of rotation, means for adjusting said wheel in the central plane thereof and on a line parallel to said axis, and means for adjusting said wheel in the central plane thereof on a line at an angle to said axis.

19. In a machine of the character described, a frame, cutter holding means mounted thereon, a main slide mounted on said frame for movement longitudinally of the cutter, an arm pivoted to said slide for swinging movement laterally of the cutter, a grinding wheel rotatably mounted on said arm, and means for guiding said grinding wheel along a predetermined path corresponding to the contour to be given to the teeth of the cutter and including cooperating parts mounted on said arm and frame.

20. In a machine of the character described, a frame, cutter holding means mounted thereon, a former plate carried by said frame in predetermined relation to the cutter supported by said holding means, a main slide mounted for longitudinal movement on said frame, an arm pivoted to said frame for swinging movement laterally of the cutter, a holder pivoted to said arm, a grinding wheel mounted in said holder, and a former stud carried by said arm and cooperating with said former plate.

21. In a machine of the character described, a frame, cutter holding means mounted thereon, a former plate on the frame, a main slide mounted for longitudinal movement on the frame, an arm pivotally mounted to said slide for swinging movement in a horizontal plane, a turret vertically pivoted on said arm, and a grinding wheel mounted on said turret for movement in the plane in which the wheel rotates and relative to the axis of said turret.

22. In a machine of the character described, cutter holding means, a former plate having a predetermined relation to the cutter carried by said holding means, tool supporting means mounted for movement in a horizontal plane longitudinally and laterally of the cutter, a turret pivoted to said supporting means on a vertical axis, a former stud having the same axis, and a grinding wheel supported on said turret for horizontal adjustment in the plane in which it rotates, said plane including said axis.

23. In a machine of the character described, a frame, cutter holding means mounted thereon, a former plate on said frame, wheel supporting means movable in a horizontal plane longitudinally and laterally, a turret pivoted on a vertical axis to said supporting means, a slide mounted for vertical adjustment on said turret, a second slide mounted for horizontal adjustment on said first slide, a grinding wheel supported on said second slide with its central plane including the axis of said turret, and a follower stud positioned on said supporting means with its axis coincident with that of said turret.

24. In a machine of the character described, a frame, cutter holding means mounted thereon, a former plate on said frame, wheel supporting means movable in a horizontal plane longitudinally and laterally, a turret, a vertical hollow sleeve pivotally connecting said turret to said wheel supporting means, a grinding wheel supported on said turret for adjustment in the central plane of the wheel, and a follower stud positioned in said sleeve and adapted to cooperate with said former plate.

25. In a machine of the character described, cutter holding means and grinding wheel holding means mounted for movement longitudinally and laterally one relative to the other during the grinding operation, means for guiding said holding means one relative to the other in a predetermined path corresponding to the contour to be given to the teeth of the cutter, a grinding wheel having a transverse cutting edge carried by said wheel holding means for angular movement about the center of curvature of said cutting edge, and means for limiting the extent of angular movement of said grinding wheel.

26. In a machine of the character described, cutter holding means, a former plate having a predetermined relation to the cutter carried by said holding means, tool supporting means mounted for movement in a horizontal plane longitudinally and laterally of the cutter, a turret pivoted to said supporting means on a vertical axis, a former stud having the same axis, a grinding wheel supported on said turret for horizontal adjustment in the plane in which it rotates, and adjustable stops cooperating with said turret to limit the extent of angular movement thereof.

27. In a machine of the character described, cutter holding means, a grinding wheel support mounted for movement in a horizontal plane longitudinally and laterally of said holding means, means for guiding said support whereby a grinding wheel carried thereby will move in a predetermined path corresponding to the contour to be given to the edge of the cutter, a grinding wheel mounted on said support, and means for limiting the extent of longitudinal movement of said support.

28. In a machine of the character described, a frame, cutter holding means mounted thereon, a main slide mounted on said frame for movement longitudinally of the cutter, an arm pivoted to said slide for swinging movement, a grinding wheel rotatably mounted on said arm, a cooperating former plate and stud for guiding said wheel along a predetermined path corresponding to the contour to be given to the edge of the cutter, and adjustable means for limiting the extent of movement of said slide for preventing the stud from over-running the ends of the former plate.

29. In a machine of the character described, a spindle adapted to support a cutter, a grinding wheel relatively movable longitudinally of the teeth of the cutter, an indexing finger against which the teeth of the cutter are adapted to engage, and means normally tending to rotate said spindle and comprising an arm loose thereon, a lever loose on said spindle and having diametrically spaced apart projections against either of which said arm is adapted to engage, means for adjustably connecting said lever to said spindle, and a spring tending to rotate said arm and the parts connected thereto.

30. In a machine of the character described, working holding means and tool holding means one mounted for longitudinal and lateral movement relative to the other, means for guiding said movable means including a pair of members, one, a former plate, having an active edge corresponding to but of greater length than the contour to be given to the work and the other, a stud, one of said members being associated with said work holding means and the other with said tool holding means, and means for moving one of said members relative to the holding means with which it is associated when said holding means are relatively moved.

31. In a machine of the character described, a frame, cutter holding means mounted thereon, wheel supporting means movable longitudinally of the cutter, a grinding wheel on said wheel supporting means, a former plate mounted on said frame for movement longitudinally of the cutter and having an active face corresponding to but of different length than the contour to be given to the teeth of the cutter, a former stud carried by said wheel holding means, and means for simultaneously moving in opposite directions said wheel supporting means and former plate whereby said grinding wheel will move in a path corresponding to the contour to be given to the cutter teeth.

32. In a machine of the character described, a frame, means for rotatably supporting a cutter thereon, a slide mounted for longitudinal movement on said frame, a work holder operatively connected to said slide, a former plate mounted for movement on said frame longitudinally of said cutter supporting means and having an active face corresponding to but of greater length than the contour to be given to the cutter teeth, a connection between said slide and former plate whereby the same are simultaneously moved in opposite directions, means for moving said slide, and a former stud carried by said work supporting means and cooperating with said former plate.

BENGT M. W. HANSON.